United States Patent

Kasschau

[15] 3,685,532

[45] Aug. 22, 1972

[54] AUTOMATICALLY SET PRESSURE DUMP VALVE

[72] Inventor: Kenneth Kasschau, Los Altos, Calif.

[73] Assignee: Westinghouse Electric Corporation, Pittsburgh, Pa.

[22] Filed: April 6, 1971

[21] Appl. No.: 131,738

[52] U.S. Cl. .....................137/107, 415/13, 417/13
[51] Int. Cl. ......................F16k 31/143, F04b 49/10
[58] Field of Search .............137/102, 107; 60/39.09; 415/13; 417/13

[56] References Cited

UNITED STATES PATENTS 3,498,056   3/1970   Avery...................137/107 X

Primary Examiner—Robert G. Nilson
Attorney—A. T. Stratton et al.

[57] ABSTRACT

An automatic reset pressure dump valve which trips a motive steam supply valve for a turbine by placing pressurized fluids supplied to the motive steam valve in communication with a drain to rapidly drop the pressure of the pressurized fluid when the pressure of the fluid drops below a predetermined amount, and which resets itself as the fluid pressure rises above the predetermined amount.

7 Claims, 2 Drawing Figures

WITNESSES

INVENTOR
Kenneth Kasschau

ATTORNEY

AUTOMATICALLY SET PRESSURE DUMP VALVE

BACKGROUND OF THE INVENTION

This invention relates to a pressure dump valve for a turbine control system, and more particularly, to an automatic reset pressure dump valve.

Steam turbines driving forced or induced draft fans normally do not have governors adequately sensitive to trip the throttle steam valves of the turbine when lubricating oil pressure drops below a predetermined value. Thus, to protect the bearings of the fans and the turbines from damage resulting from insufficient lubrication it is desirable to provide a pressure dump valve, which will produce a clearly defined signal, which will cause the steam supply valve to trip when the pressure of the lubricating oil drops below a predetermined amount.

SUMMARY OF THE INVENTION

In general, an automatic reset pressure dump valve for a turbine control system having a motive steam valve, which is tripped and closed, when a supply of pressurized fluid for lubricating the rotating equipment drops below a predetermined pressure, made in accordance with this invention, comprises a first cylinder having a first movable piston disposed therein, the first movable piston dividing the first cylinder into first and second chambers, a first port in communication with the first chamber and with the supply of pressurized fluid, and a second port in communication with the second chamber and with the turbine control system. Such a dump valve further comprises a second movable piston associated therewith, the second movable piston forming a third chamber within the second cylinder, and a third port disposed in the second cylinder and in communication with a drain and with the third chamber. The first piston has an opening therein for placing the first and second chambers in communication, and a plug is integrally associated with the second piston and registers with the opening of the first piston to provide closure of the opening to permit automatic resetting of the dump valve as the pressure of the pressurized fluid increases above the predetermined amount. A spring biases the first piston toward the first port to disengage the plug and opening after the dump valve is reset. Such a dump valve also comprises means associated with the second movable piston for placing the second chamber in communication with the drain when the pressure of the pressurized fluid decreases to the predetermined pressure, causing the turbine control system to be in communication with the drain, resulting in rapid closing of the steam supply valve.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
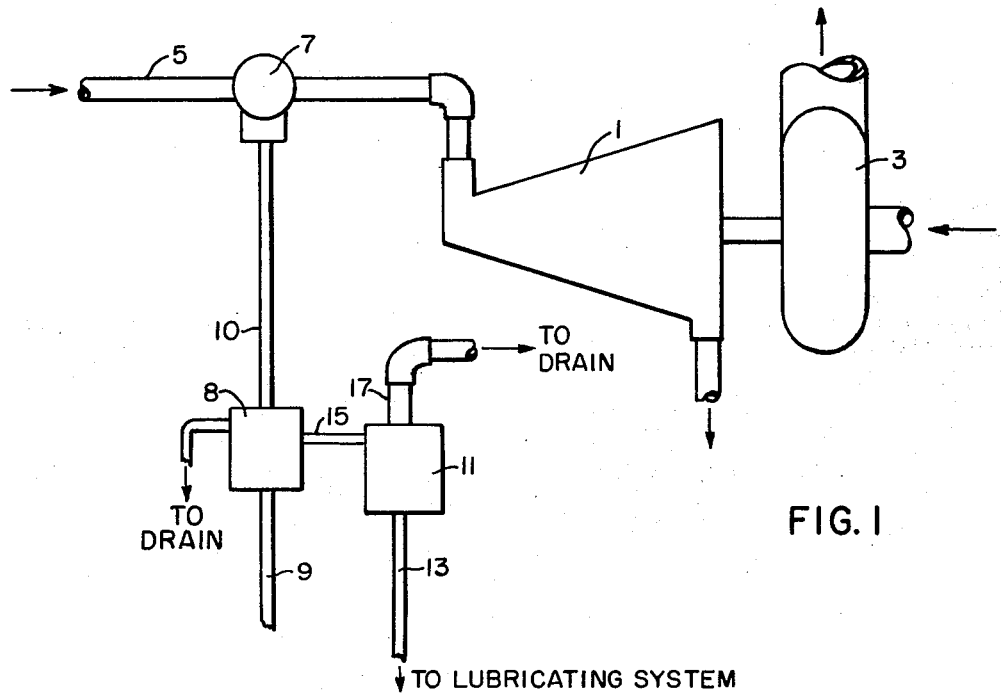
FIG. 1 diagrammatically shows an automatic pressure dump valve made in accordance with this invention disposed in a control system for a turbine.

Referring now to the drawings in detail, FIG. 1 shows a turbine 1 driving a forced draft fan 3 for a boiler (not shown). Motive steam is supplied to the turbine through a supply conduit 5. A motive steam supply valve 7 regulates the amount of steam entering the turbine 1. A governor, a portion of which is shown at 8, controls the flow of pressurized fluid, normally lubricating oil, but at a pressure substantially greater than the latter, flowing to the supply valve 7 via a conduit 9 leading to the governor 8 and a conduit 10 disposed between the governor 8 and the supply valve 7. The supply valve 7 will trip and close when the pressure of the fluid supplied to the lubrication system drops below a predetermined amount. An automatic reset pressure dump valve 11 is shown as supplied with oil at lubricating pressure via conduit 13 and in communication with the governor 8 via conduit 15. A conduit 17 extending from the top of the dump valve 11 is in communication with a drain.

Figure 2:
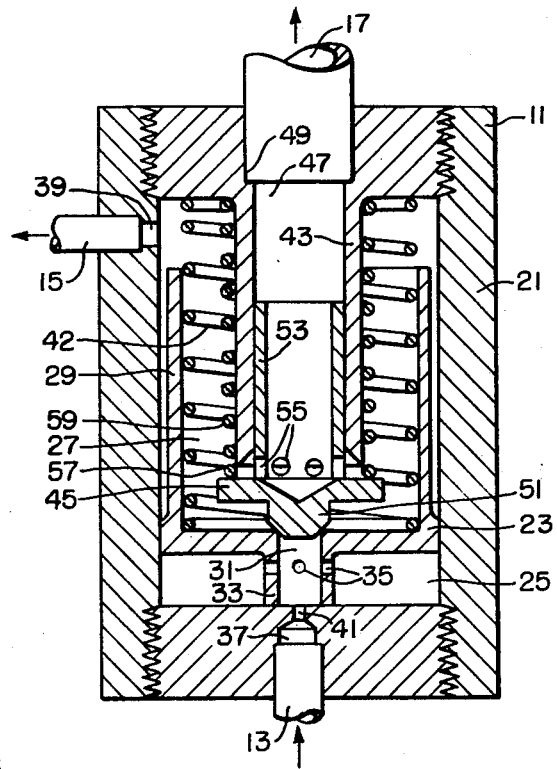
FIG. 2 is an enlarged vertical sectional view of the automatic pressure dump valve.

Referring now to FIG. 2, the automatic reset pressure dump valve 11 comprises a first cylinder 21 having a first movable abutment or piston 23 disposed therein and dividing the cylinder 21 into first and second chambers 25 and 27, respectively. The first piston 23 has a sleeve portion 29 extending therefrom, the sleeve portion 29 being slidably received by the cylinder 21. The piston 23 also has a central opening 31 and a tubular portion 33 extending in opposite direction from the sleeve portion 29. The tubular portion 33 has ports 35 disposed therein.

The first cylinder 21 has a first port 37 in communication with the first chamber 25 and the supply of pressurized fluid via the conduit 13, and a second port 39 in communication with the second chamber 27 and with the supply of pressurized fluid via the conduit 15. The first port 37 has an orifice 41 disposed therein. A spring 42 biases the first piston 23 downwardly in direction of the first port 37, the tubular projection 33 serving to space piston 23 from the end of cylinder to permit access of fluid through ports 37 and 35.

A second cylinder 43 is disposed concentrically within the first cylinder 21 and is in communication therewith, the second cylinder having a second movable abutment or piston 45 associated with it to form a third chamber 47 within the second cylinder 43. A third port 49 is disposed at one end of the second cylinder 43 and is in communication with the drain conduit 17 and with the third chamber 47.

As shown in FIG. 2, the second piston 45 has a plug 51 extending downwardly therefrom. The plug 51 registers with the opening 31, to close the opening, so that as the pressure in chamber 25 increases, the dump valve resets itself. Extending from the piston 45, in opposite direction from the plug 51, is a sleeve 53, the sleeve being slidably received in the cylinder 43. In the lower portion of the sleeve 53, adjacent the piston 45, are a plurality of ports 55, which allow fluid to flow from the second chamber 27 to the third chamber 47, when the piston 45 is moved downwardly, away from an annular margin 57 of the second cylinder 43, by the bias of a spring 59 which is coiled around the outer wall portion of the second cylinder 43. The annular margin 57 of the second cylinder 43 is beveled outwardly to form a relatively sharp edge which cooperates with the piston 45 to form a seal between the second and third chambers 27 and 47, when the second piston 45 is moved upwardly against the annular margin 57 of the second cylinder 43.

FIG. 2 shows the dump valve 11 in its dumping positions, wherein the second and third ports 39 and 49 are in communication through the second and third chamber 27 and 47 and the ports 55. Before the governor can take over control of the turbine during startup, it must first sense adequate lubricating oil pressure (which closes an internal dump, not shown). During startup of the turbine lubricating oil is pressurized by a special startup pump (not shown). As the pressure increases in conduit 13, pressurized fluid enters the first chamber 25, via the port 37 and ports 35, causing the pressure in the first chamber 25 to increase, and the first and second pistons 23 and 45 to move upwardly against the bias of the springs 42 and 59, until the second piston engages the annular margin 57 of the second cylinder 43 to form a seal between the second and third chamber 27 and 47 respectively. The diameter of the first piston 23 is sufficiently smaller than the diameter of the cylinder 11 so that, with drainage thus stopped, leakage flow between piston 23 and cylinder 21 causes the pressure in the second chamber 27 to increase, until the bias of the spring 42, cooperating with the pressure in the second chamber 27 causes the first piston 23 to move downwardly toward the first portion 37. This pressure is selected as the desirable minimum lubricating pressure and is transmitted through port 39 to the governor device which senses lubricating oil pressure. Once the governor senses adequate lubricating pressure it takes over control of the turbine.

The pressure in the second chamber is sufficient to hold the second piston 45 in engagement with the margin 57 of the second cylinder 43 against the bias of the spring 59, since the third chamber 47 is in communication with the drain via the third port 49 and the conduit 17, the pressure therein is essentially atmospheric.

As the pressure of the pressurized fluid drops to a predetermined pressure, the bias of the spring 59 overcomes the force of the pressure on the second piston 45 causing it to move downwardly away from the annular margin 57, placing the second and third ports 39 and 49 in communication, thus rapidly dropping the pressure in the second chamber 27 and in the conduit 15. This causes the governor to sense low lube oil pressure and through internal passages (not shown) causes the steam supply valve 7 to close. Thus the turbine and forced draft fan are allowed to coast down, while there is still a sufficient amount of pressure in the lubricating oil system to supply the bearing during the coastdown period. During the period that piston 45 is moving from contact at edge 57 to contact at port 31 the orifice 41 restricts flow, thereby preventing diversion of the limited lube oil supply from the vital job of keeping the bearings properly lubricated. Once the cause of the low pressure has been remedied, the dump valve will automatically reset as the pressure of the pressurized fluid increases above the predetermined amount.

What is claimed is:

1. An automatic reset pressure dump valve for a turbine control system having a motive steam supply valve which is tripped and closed when a supply of pressurized fluid to said dump valve drops below a predetermined pressure, said automatic reset pressure dump valve comprising
   a first cylinder having a first movable abutment disposed therein, said first movable abutment dividing said first cylinder into first and second chambers,
   a first port in communication with said first chamber and with said supply of pressurized fluid,
   a second port in communication with said second chamber and with said turbine control system,
   a second cylinder in communication with said second chamber, said second cylinder having a second movable abutment associated therewith, said second movable abutment forming a third chamber within said second cylinder,
   a third port disposed in said second cylinder and in communication with a drain and with said third chamber,
   said first abutment having an opening therein for placing said first and second cylinders in communication,
   a plug associated with said second abutment, said plug registering with said opening to provide automatic resetting of said dump valve as the pressure of said pressurized fluid increases above said predetermined pressure,
   means for slowly equalizing the pressure in said first and second chambers,
   a spring biasing said first abutment toward said first port to disengage said plug and said opening as the pressure in the second chamber approaches the pressure in the first chamber, and
   means associated with said second cylinder and said second abutment for placing said second port in communication with said third port when the pressure of said pressurized fluid decreases to said predetermined value causing said turbine control system to be in communication with said drain resulting in said steam supply valve tripping and closing.

2. An automatic reset pressure dump valve as set forth in claim 1, wherein the means for placing the second and third ports in communication comprises
   a spring biasing the second movable abutment in direction of the first movable abutment, a sleeve extending from the second movable abutment, said sleeve being slidably received by the second cylinder,
   at least one port in said sleeve for allowing fluid to flow from the second chamber to the third chamber when the second movable abutment moves in direction of the first movable abutment as the pressure of the pressurized fluid decreases to the predetermined amount.

3. An automatic reset pressure dump valve as set forth in claim 1, wherein the means for placing the second and third ports in communication comprises
   a second spring biasing the second movable abutment toward the first movable abutment, a cylindrical sleeve extending from the second movable abutment, said sleeve being slidably received in the second cylinder, at least one port in said sleeve for allowing fluid to flow from the second chamber into the third chamber and out of the third port when the second movable abutment moves away from an annular margin of the second cylinder as the pressure of the pressurized fluid decreases to the predetermined pressure, the second movable abutment cooperating with said annular margin to stop fluid from flowing from the second to the third chamber when the pressure of pressurized fluid exceeds the predetermined pressure.

4. An automatic reset dump valve as set forth in claim 1, wherein the first port has a flow restriction disposed therein to limit the flow therethrough.

5. An automatic reset dump valve as set forth in claim 1, wherein the first movable abutment has a tubular portion extending therefrom, said tubular portion having ports therein for allowing fluid to flow from the first port to the first chamber when the first movable abutment is at the end of its stroke in direction of the first port.

6. An automatic reset dump valve as set forth in claim 1, wherein the second cylinder is disposed within the first cylinder.

7. An automatic reset dump valve as set forth in claim 1 wherein the first abutment has a diameter sufficiently smaller than the diameter of the first cylinder to provide the means for slowly equalizing the pressure in the first and second chambers.

* * * * *